Patented Nov. 10, 1942

2,301,382

UNITED STATES PATENT OFFICE 2,301,382

1,4-NAPHTHOQUINONE COMPOUNDS

Joseph B. Dickey and James G. McNally, Rochester, N. Y., assignors to Eastman Kodak Company, Rochester, N. Y., a corporation of New Jersey No Drawing. Application January 6, 1940, Serial No. 312,740

1 Claim. (Cl. 260—396)

This invention relates to the art of dyeing or coloring. More particularly it relates to a new class of water-soluble 1,4-naphthoquinone compounds and the application of the nuclear unsulfonated compounds for the coloration of organic derivatives of cellulose, especially cellulose acetate silk, by dyeing, printing, stenciling or like methods.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

It is an object of our invention to provide a new class of water-soluble 1,4-naphthoquinone dye compounds. Another object of our invention is to provide a process for the coloration of organic derivatives of cellulose. A further object is to provide colored organic derivative of cellulose textile materials which are of good fastness to light and washing. Other objects will hereinafter appear.

The 1,4-naphthoquinone compounds by means of which the above objects are accomplished or made possible are characterized in that they contain an acid ester of an acid of phosphorus group joined through an organic linkage to an amino nitrogen atom which is directly attached to the 1,4-naphthoquinone nucleus.

The 1,4-naphthoquinone compounds of our invention can be represented for the most part by the general formula:

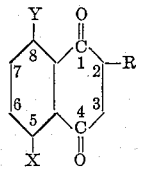

wherein R represents an amino group having attached thereto through carbon an organic linkage which contains at least two carbon atoms and which has an acid ester of an acid of phosphorus group joined thereto and X and Y each represents a member selected from the group consisting of R, a hydroxy group, an alkyl-, an unsaturated alkyl-, a cycloalkyl-, an aralkyl-, an aryl-, and a heterocyclic-amino group and wherein R has the meaning above given.

The acid ester of an acid of phosphorus compounds of our invention can be prepared by esterifying to an acid ester of an acid of phosphorus a 1,4-naphthoquinone compound containing a hydroxy group capable of being esterified joined through an organic linkage to an amino nitrogen atom which is attached directly to the 1,4-naphthoquinone nucleus.

The term "alkyl" as used herein and in the claim, unless otherwise indicated, includes not only unsubstituted alkyl groups such as a methyl group, an ethyl group, a propyl group or a butyl group but also substituted alkyl groups such as β-hydroxyethyl, β-hydroxypropyl, β-γ-dihydroxypropyl, γ-hydroxypropyl, Δ-hydroxybutyl, β-methoxyethyl, β-ethoxyethyl, β'-methoxy-β-ethoxyethyl, β-chloroethyl, γ-chloropropyl, β-sulfoethyl, γ-sulfopropyl, β-sulfatoethyl, γ-sulfatoethyl, —CH₂CH₂NH₂ and

for example.

Illustrative of cycloalkyl may be mentioned cyclobutyl, cyclohexyl and cycloheptyl; of aralkyl, benzyl and phenyl ethyl; of aryl, phenyl and naphthyl and of unsaturated alkyl, vinyl, allyl, —CH₂CH₂CH=CH₂ and —CH₂CH₂CH₂CH=CH₂. Similarly, as illustrative of heterocyclic may be mentioned morpholine, quinoline, pyridine, furyl, acridine, carbazole and acridone.

The acid ester of an acid of phosphorus group as previously stated is joined to the amino nitrogen atom which is directly attached to the 1,4-naphthoquinone nucleus through an organic linkage. This organic linkage can be an organic linkage such as an aliphatic, an aryl, or a cycloalkyl linkage. Ordinarily an aliphatic linkage is employed. Compounds wherein the organic linkage is an alkylene radical containing at least two carbon atoms such as —CH₂CH₂—, —CH₂CH₂CH₂— and —CH₂CH₂CH₂CH₂— are generally advantageous.

The acid ester of an acid of phosphorus group may be, for example, a phosphoric acid ester group, a phosphorus acid ester group and a thiophosphoric acid ester group. By "a phosphoric acid ester group" we include the phosphoric acid group in its free acid,

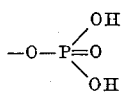

or salt form, such as

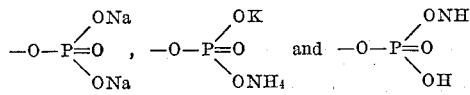

for example, as well as substituted phosphoric acid groups such as

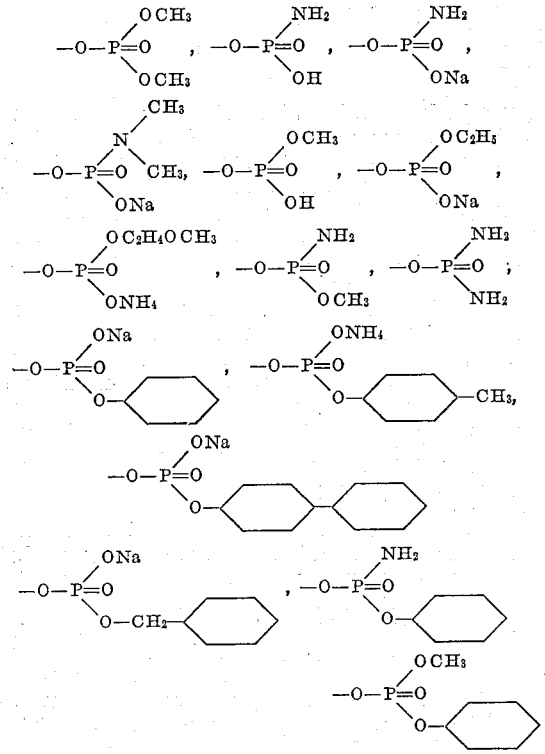

and

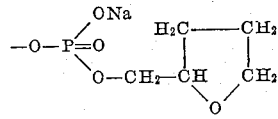

for example.

Similarly by "a thiophosphoric acid ester group" we include, for example, the thiophosphoric acid ester groups corresponding to the phosphoric acid ester groups just given. The formulae for these thiophosphoric acid ester groups are obtained by replacing the double bonded oxygen atom attached to phosphorus in the formulae given for representative phosphoric acid ester groups with an atom of sulfur. Also by "a phosphorous acid ester group" we include, for example, the phosphorous acid ester groups corresponding to the phosphoric acid ester groups just given. The formulae for these phosphorous acid ester groups are obtained by omitting the double bonded oxygen atom attached to phosphorous in the formulae given for representative phosphoric acid ester groups.

The organic linkage containing a hydroxy group capable of being esterified to an acid ester of an acid of phosphorus can be a hydroxy aliphatic groups such as —CH₂CH₂OH, —CH₂CHOHCH₃, —CH₂CH₂CH₂OH, —CH₂CHOHCH₂OH, —CH₂CH₂CH₂CH₂OH and —CH₂CH₂—O—CH₂CH₂OH; a hydroxyaryl group such as

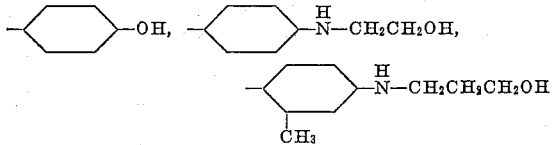

and

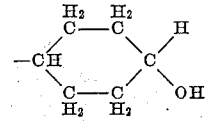

and a hydroxycycloalkyl group such as

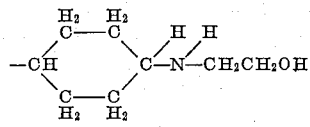

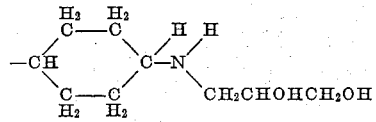

and

As previously indicated, the nuclear unsulfonated compounds of our invention can be employed for the dyeing or coloration of organic derivatives of cellulose. These compounds likewise possess some application for the dyeing of wool and silk. The nuclear sulfonated compounds possess little or no utility for the dyeing of organic derivatives of cellulose but can be employed for the dyeing of wool and silk. Sulfonated compounds, when desired, can be prepared by sulfonation of the unsulfonated compounds in known fashion. Alternately the sulfonic group can be initially present in the 1,4-naphthoquinone nucleus.

Generally speaking, compounds wherein not more than one of the hydrogen atoms of the acid ester of an acid of phosphorus group is replaced with a salt forming atom or radical imparting water solubility are better adapted for the dyeing or coloring of organic derivatives of cellulose such as cellulose acetate than those which contain more than one such salt forming atom or radical.

The following examples illustrate the preparation of the 1,4-naphthoquinone compounds of our invention:

EXAMPLE 1

24.9 grams of 2-β-hydroxyethylamino-5,8-dihydroxy-1,4-naphthoquinone are placed in 400 cc. of dry pyridine and 16 grams of phosphorus oxychloride are added dropwise with stirring while maintaining the mixture in a cold condition. After standing over night, the mixture is warmed to 40–50° C. for one hour after which it is poured on ice and sodium carbonate to effect hydrolysis. The resulting solution is concentrated to dryness under reduced pressure and the residue obtained is washed with warm water and filtered. The dye compound formed is salted out from the filtrate by the addition of sodium chloride, recovered by filtration and dried. The dye compound obtained has the probable formula:

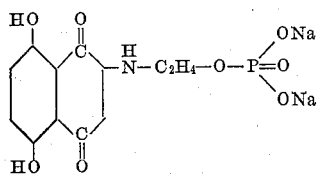

and colors cellulose acetate silk, wool and silk violet.

EXAMPLE 2

29.2 grams of 2,8-di-β-hydroxyethylamino-5-hydroxy-1,4-naphthoquinone are treated as in Example 1 with 32 grams of

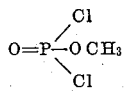

The dye compound obtained has the probable formula:

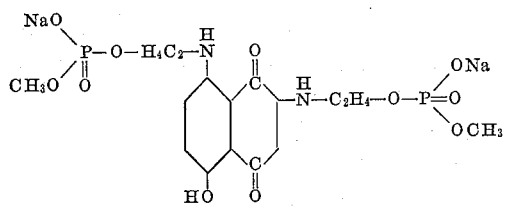

and colors cellulose acetate silk, wool and silk violet.

EXAMPLE 3

33.5 grams of 2,5,8-tri-β-hydroxyethylamino-1,4-naphthoquinone are placed in 500 cc. of dry pyridine and treated with 16 grams of phosphorus oxychloride in accordance with the method described in Example 1. The dye compound obtained colors cellulose acetate silk bluish-green. The exact formula of the dye compound obtained is not known but either complete conversion of one of the β-hydroxyethylamino groups or partial conversion of two or more of these groups to a

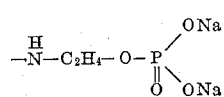

group occurs.

EXAMPLE 4

34 grams of 2-γ-hydroxypropylamino-8-phenylamino-5-hydroxy-1,4-naphthoquinone are placed in 500 cc. of dry cold pyridine and treated with 22 grams of

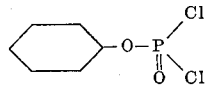

in accordance with the method set forth in Example 1, except that the ammonium salt is prepared. The dye compound obtained,

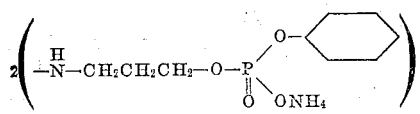

-8-phenylamino-5-hydroxy-1,4-naphthoquinone colors cellulose acetate silk, wool and silk bluish-red shades.

EXAMPLE 5

29.2 grams of 2,8-di-β-hydroxyethylamino-5-hydroxy-1,4-naphthoqinone are added to 500 cc. of dry cold pyridine and treated in accordance with the method described in Example 1 with 36 grams of $PSCl_3$. The dye compound obtained, 2,8-di-

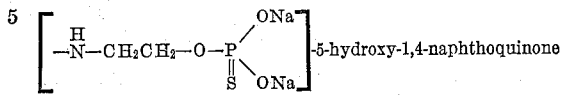-5-hydroxy-1,4-naphthoquinone colors wool, silk and cellulose acetate silk reddish-blue.

An equivalent gram molecular weight of

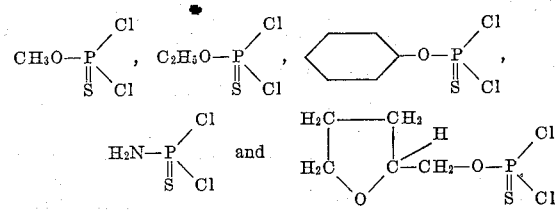

for example, can be substituted for the $PSCl_3$ of the example to obtain

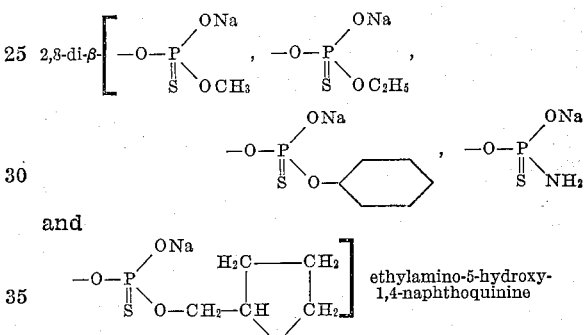

and

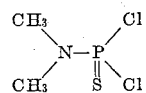 ethylamino-5-hydroxy-1,4-naphthoquinine respectively. These dye compounds color cellulose acetate silk, wool and silk reddish-blue. If equivalent gram molecular weights of 2,8-di-β-hydroxyethylamino-5-hydroxy-1,4-naphthoquinone and of the phosphating agent are employed compounds are obtained in which either one of the β-hydroxyethylamino groups is completely esterified to the ester groupings indicated or both β-hydroxyethylamino groups are partially so esterified. The dye compounds thus obtained color cellulose acetate silk, wool and silk reddish-blue.

EXAMPLE 6

35 grams of 2-β-hydroxyethylamino-5-methylamino-8-tetrahydrofurfurylamino-1,4-naphthoquinone are placed in 500 cc. of dimethylaminocyclohexylamine and treated with 17 grams of

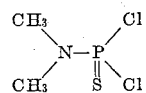

in accordance with the general method described in Example 1, except that the triethanolamine salt is prepared.

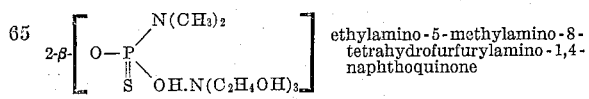 ethylamino-5-methylamino-8-tetrahydrofurfurylamino-1,4-naphthoquinone is obtained and colors cellulose acetate silk, wool and silk bluish-green.

EXAMPLE 7

One tenth gram mole of 2(4'-β-hydroxyethylamino)phenylamino-5,8-dihydroxy-1,4-naphthoquinone is placed in 500 cc. of pyridine and treated with an equivalent gram molecular weight (slight excess) of

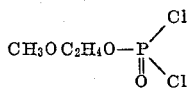

in accordance with the general method described in Example 1.

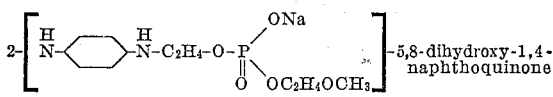

is obtained and colors cellulose acetate silk, wool and silk violet.

An equivalent gram molecular weight of 2-p-aminocyclohexanol -5,8- dihydroxy-1,4-naphthoquinone, and 2-(4'-β-hydroxypropylphenylamino)-5,8-dihydroxy-1,4-naphthoquinone, for example, can be substituted for the naphthazarine compound of the example to obtain dye compounds likewise included within the scope of our invention. The dye compounds obtained color cellulose acetate silk, wool and silk violet.

Example 8

52 grams of 2,5-di-β-hydroxyethylamino-8-cetylamino-1,4-naphthoquinone are placed in 500 cc. of cold pyridine and 31 grams of

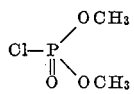

are added dropwise with stirring while maintaining the reaction mixture in a cooled condition. After standing overnight, the mixture is warmed to 40–50° C. for one hour and then poured onto ice. The resulting solution is concentrated under reduced pressure to dryness after which the residue is dissolved in warm water and filtered. The dye compound formed is precipitated by the addition of sodium chloride, recovered by filtration and dried.

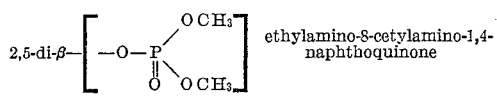

is obtained and colors cellulose acetate silk, wool and silk greenish-blue.

An equivalent gram molecular weight of 2-β-hydroxyethylamino -5- hydroxy-8-γ-hydroxypropylamino-1,4-naphthoquinone and 2-glycerylamino-5-hydroxy-8-ethylamino-1,4-naphthoquinone, for example, can be substituted for the naphthazarine compound of the example to obtain dye compounds included within the scope of our invention which color cellulose acetate silk, wool and silk greenish-blue. Similarly other phosphating agents, such as those specifically disclosed herein, can be employed.

Example 9

34 grams of 2,5,8-tri-β-hydroxyethylamino-1,4-naphthoquinone are reacted in pyridine with 25 grams of phosphorus pentoxide at 60–100° C. When reaction is complete, the reaction mixture is poured into water and neutralized by the addition of calcium hydroxide. Upon working up the reaction mixture in known fashion, a dye compound is obtained which colors cellulose acetate silk, wool and silk bluish-green.

Example 10

19 grams of 5,8-dihydroxy-1,4-naphthoquinone, 40 grams of

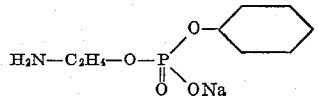

and 160 cc. of a 30% methylamine solution are heated together in a shaking autoclave at 50–60° C. for 10 to 20 hours. The reaction mixture is then filtered and the desired dye compound is precipitated from the filtrate by the addition of sodium chloride. The dye compound obtained colors cellulose acetate silk, wool and silk bluish-green.

Example 11

29.2 grams of 2,8-di-β-hydroxyethylamino-5-hydroxy-1,4-naphthoquinone are placed in 450 cc. of pyridine and 28 grams of PCl3 are added dropwise. When reaction is complete, the dye compound formed is hydrolyzed by treatment with sodium carbonate. The resulting solution is concentrated under reduced pressure to dryness and the residue is dissolved in warm water and filtered. The desired dye compound is precipitated by adding sodium chloride, recovered by filtration and dried. The dye compound obtained has the probable formula:

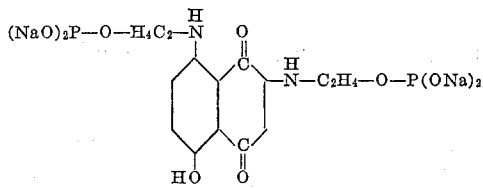

and colors wool and silk and to some extent cellulose acetate silk violet.

An equivalent gram molecular weight of

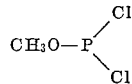

can be substituted for the PCl3 of the example to obtain a dye compound which colors cellulose acetate silk, wool and silk violet.

Similarly other agents yielding a phosphorous acid ester, such as

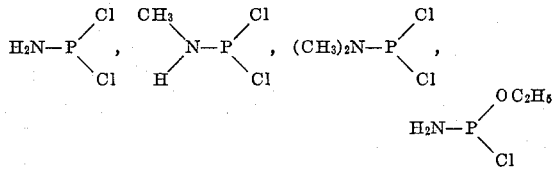

and

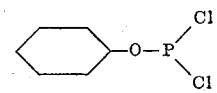

for example, can be employed in conjunction with the 1,4-naphthoquinone compound of this example or 1,4-naphthoquinone compounds of other examples. The dye compounds obtained using the 1,4-naphthoquinone compound of the example color cellulose acetate silk, wool and silk violet.

Other 1,4-naphthoquinone compounds which can be employed in the preparation of the compounds of our invention include, for example, 2 - glycerylamino - 5 - allylamino-8-hydroxy-1,4-naphthoquinone, 2 - β-hydroxypropylamino-5-hydroxy-8-cyclohexylamino-1,4-naphthoquinone, 2-

β-hydroxyethylamino-5-hydroxy-8-benzylamino-1,4-naphthoquinone, 2-γ-hydroxypropylamino-5,8-ditetrahydrofurfurylamino-1,4-naphthoquinone and 2-β-hydroxyethylamino-5,8-crotonylamino-1,4-naphthoquinone. Where the grouping undergoing esterification contains two or more hydroxy groups the exact formula of the compound formed is usually difficult to determine, however, esterification of one or more of the hydroxy groups takes place.

It will be understood that the foregoing examples are intended to be illustrative and not limitative of our invention as it is readily apparent from the description to those skilled in the art how various other compounds included within the scope of our invention but not specifically shown herein can be prepared.

In order that our invention may be clearly understood, various phosphating agents and their preparation are indicated hereinafter. Suitable phosphating agents include, for example, phosphorus oxychloride, $POCl_3$, phosphorus oxybromide, $POBr_3$, phosphoric acid, $H_3PO_4$, phosphorus pentoxide, $P_2O_5$, phosphorus sulfochloride, $PSCl_3$, phosphorus sulfobromide, $PSBr_3$, and phosphorus pentasulfide, $P_2S_5$. The use of phosphorus oxychloride, phosphorus sulfochloride and phosphorus pentoxide is shown in Examples 1, 5 and 9, respectively.

Compounds having the general formula

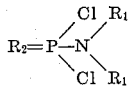

wherein $R_1$ represents hydrogen or an alkyl group and $R_2$ represents oxygen or sulfur may likewise be used as phosphating agents. The use of compounds of this character is illustrated in Examples 5 and 6. Also compounds having the general formula

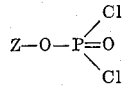

wherein Z is an aryl nucleus can be employed as is shown by Example 4.

Compounds having the general formula:

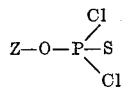

wherein Z is an aryl nucleus likewise constitute phosphating agents as can be seen from Example 5.

Other phosphating compounds having the formulae:

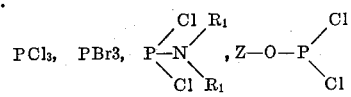

and

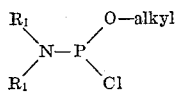

for example, wherein $R_1$ and Z have the meanings previously assigned to them can likewise be employed. The use of such compounds is illustrated in Example 11.

Phosphating compounds having the general formula:

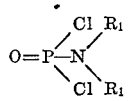

wherein $R_1$ represents hydrogen or an alkyl group may be prepared by reacting in equal molecular proportions phosphorus oxychloride with a compound having the general formula:

wherein $R_1$ represents hydrogen or an alkyl group. Phosphorus oxychloride can be reacted, for example, with ammonia, methylamine, ethylamine, dimethylamine and ethanolamine to obtain

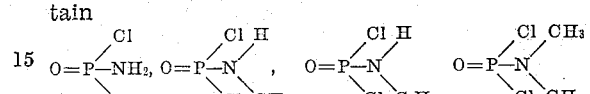

and

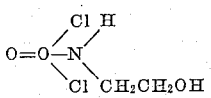

respectively. The corresponding thiophosphoric compounds can be obtained by substituting phosphorus sulfochloride for phosphorus oxychloride.

Phosphating compounds having the general formula:

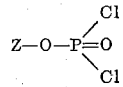

wherein Z is an aryl nucleus can be prepared by reacting phosphorus oxychloride with a hydroxy aryl compound in equal molar proportions. Suitable hydroxyaryl compounds include phenol and naphthol. By the substitution of a hydroxyalkyl, a hydroxycycloalkyl or a hydroxyaralkyl compound such as methyl alcohol, ethyl alcohol, cyclohexanol and benzyl alcohol for a hydroxyaryl compound, compounds wherein Z is alkyl, cycloalkyl or aralkyl can likewise be prepared. Further, by the substitution of phosphorus sulfochloride for phosphorus oxychloride, the corresponding thiophosphoric compounds can be prepared.

Phosphating compounds having the general formula:

can be prepared by reacting $PCl_3$ with a compound having the general formula

Compounds of the general formula

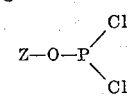

can be prepared by reacting $PCl_3$ with a compound having the general formula Z—OH. Further compounds of the general formula

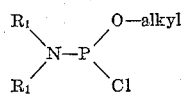

can be prepared by reacting compounds of the general formula:

with an aliphatic alcohol. In the foregoing formulae R₁ represents hydrogen and alkyl while Z represents aryl, cycloalkyl, alkyl and aralkyl.

The general method of preparing the phosphating agents will be further clarified by the following examples:

*Preparation of*

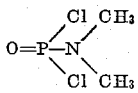

16 grams of phosphorus oxychloride are dissolved in 100 grams of dry pyridine and the resulting solution is cooled to 0° C. 45 grams of dimethylamine dissolved in 50 cc. of cold dry pyridine are then added with stirring and stirring is continued until reaction is complete. The desired compound may be recovered by fractional distillation of the reaction mixture under reduced pressure.

*Preparation of phenyl phosphoryl chloride*

47 grams of phenol, 154 grams of phosphorus oxychloride, and 7.5 grams of magnesium chloride are mixed together and heated on a steam bath for 8 hours, following which the reaction mixture is heated to 110–120° C. for 2½ hours. The reaction mixture is then fractionated under reduced pressure to give a good yield of phenyl phosphoryl chloride boiling at 95–105°/3 mm. Thiophosphoryl chloride can be substituted for phosphorus oxychloride in the above reaction to prepare phenyl thiophosphoryl chloride. Other hydroxy aromatic compounds can be substituted for phenol in the above reaction to obtain various aromatic phosphoryl chlorides.

*Preparation of amyl thiophosphoryl chloride*

85 grams of thiophosphoryl chloride in 50 cc. of chloroform are added to 44 grams of amyl alcohol in 150 cc. of chloroform and the reaction mixture is heated on a steam bath for 12 hours. The chloroform may be removed by distillation under reduced pressure to obtain amyl thiophosphoryl chloride. By the use of 88 grams of amyl alcohol, diamyl thiophosphoryl chloride can be obtained. Similarly, by the use of phosphoryl chloride, the corresponding phosphoryl chlorides can be prepared. Again, by the use of an alcohol other than amyl, other thiophosphoryl compounds can be prepared. To illustrate, if ethyl alcohol is used, ethyl thiophosphoryl chloride and diethyl thiophosphoryl chloride can be prepared.

*Preparation of ethylaminophosphoryl chloride*

53 grams of ethylamine hydrochloride is heated with 200 grams of phosphorus oxychloride and the mixture is refluxed for four hours. Any excess phosphorus oxychloride may be removed by distillation. The product obtained has the formula:

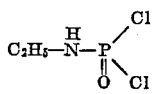

In place of ethylamine, any primary or secondary alkylamine may be used and in place of phosphoryl chloride, thiophosphoryl chloride may be used. If n-propylamine hydrochloride is substituted for ethylamine hydrochloride above, for example, n-propylaminophosphoryl chloride can be obtained. Similarly, if PSCl₃ is substituted for phosphorus oxychloride, ethylaminothiophosphoryl chloride will be obtained.

The 1,4-naphthoquinone compounds of our invention are, for the most part, sufficiently water soluble that they can be employed for the direct coloration of organic derivatives of cellulose, silk and wool or mixtures of these materials without the necessity of using a dispersing or solubilizing agent. The dyeing operations can be conducted in accordance with the usual dyeing practice. The water soluble 1,4-naphthoquinone dye compounds of our invention can be employed for the coloration of the above materials in accordance with the teachings of our U. S. Patent No. 2,107,898, issued February 8, 1938. If it is desired to use a solubilizing or dispersing agent, the 1,4-naphthoquinone dye compounds of our invention can be employed for the coloration of said materials in accordance with the teachings of our U. S. Patent No. 2,108,824, issued February 22, 1938.

Unsymmetrical alkylamino 1,4-naphthoquinone compounds, such as those shown in Example 8, can be prepared as described and claimed in our copending application Serial No. 308,458, filed December 9, 1939. Furanamino 1,4-naphthoquinone compounds, such as that shown in Example 6, can be prepared in accordance with the teachings of our copending application Serial No. 308,457, filed December 9, 1939, wherein they are described and claimed.

It will be understood that the free acid form of the 1,4-naphthoquinone dye compounds of our invention can be prepared from their salt forms by methods known to the art for the conversion of a salt to its free acid form. The conversion can be effected, for example, by treatment with a mineral acid such as hydrochloric acid.

We claim:

The 1,4-naphthoquinone compounds having the formula:

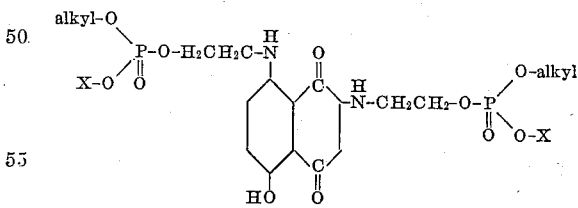

wherein X stands for a salt forming group selected from the group consisting of an alkali metal and ammonium.

JOSEPH B. DICKEY.
JAMES G. McNALLY.